March 10, 1925.

R. DERRICK

CHOPPER

Filed Oct. 22, 1923

Roy Derrick.
INVENTOR

BY *Victor J. Evans*
ATTORNEY

WITNESS

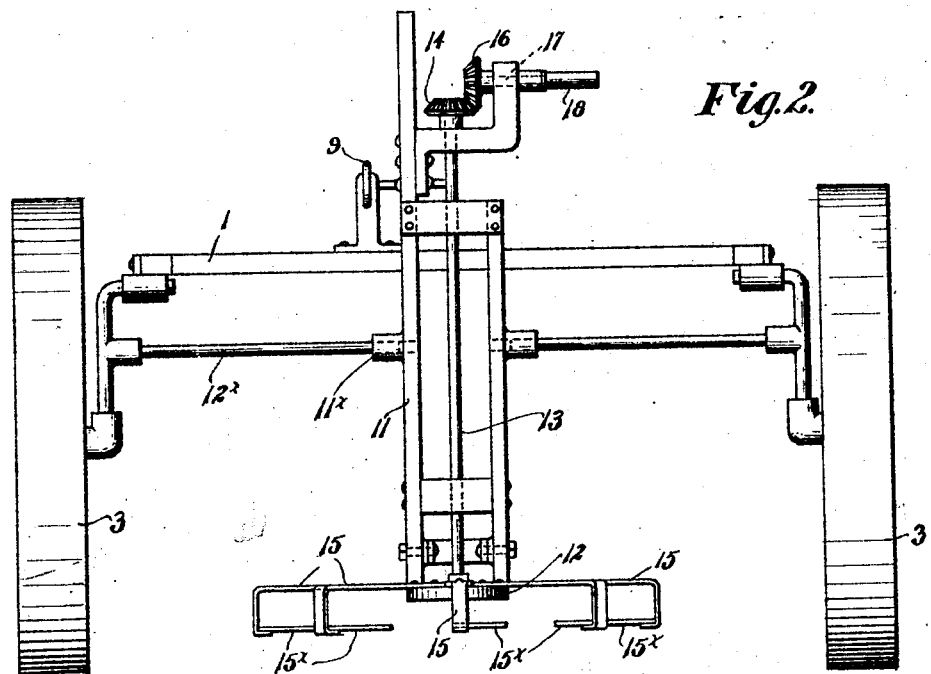
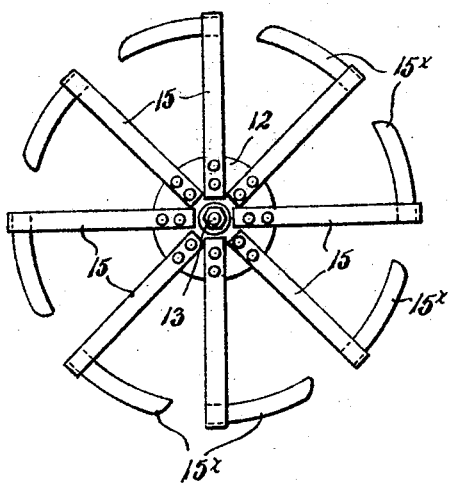
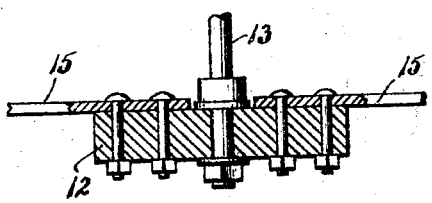

Patented Mar. 10, 1925.

1,529,577

UNITED STATES PATENT OFFICE.

ROY DERRICK, OF HICO, TEXAS.

CHOPPER.

Application filed October 22, 1923. Serial No. 670,115.

*To all whom it may concern:*

Be it known that I, ROY DERRICK, a citizen of the United States, residing at Hico, in the county of Hamilton and State of Texas, have invented new and useful Improvements in Choppers, of which the following is a specification.

The object of my said invention is the provision of a manually operable and controlled chopper for cotton and other plants and the like, the chopper being carried by a wheeled cultivator and being susceptible of manual adjustment so as to position its blades at the proper distance above the ground in the discretion of the driver who rides on the cultivator.

To the attainment of the foregoing, the invention consists in the improvement as hereinafter described and definitely claimed.

In the accompanying drawings, forming part of this specification:—

Figure 2 is a rear end elevation of the same.

Figure 3 is a top plan view of the rotary chopper.

Figure 4 is an enlarged diametrical section of the central portion of the same.

Similar numerals of reference designate corresponding parts in all of the views of the drawings.

Figure 1:
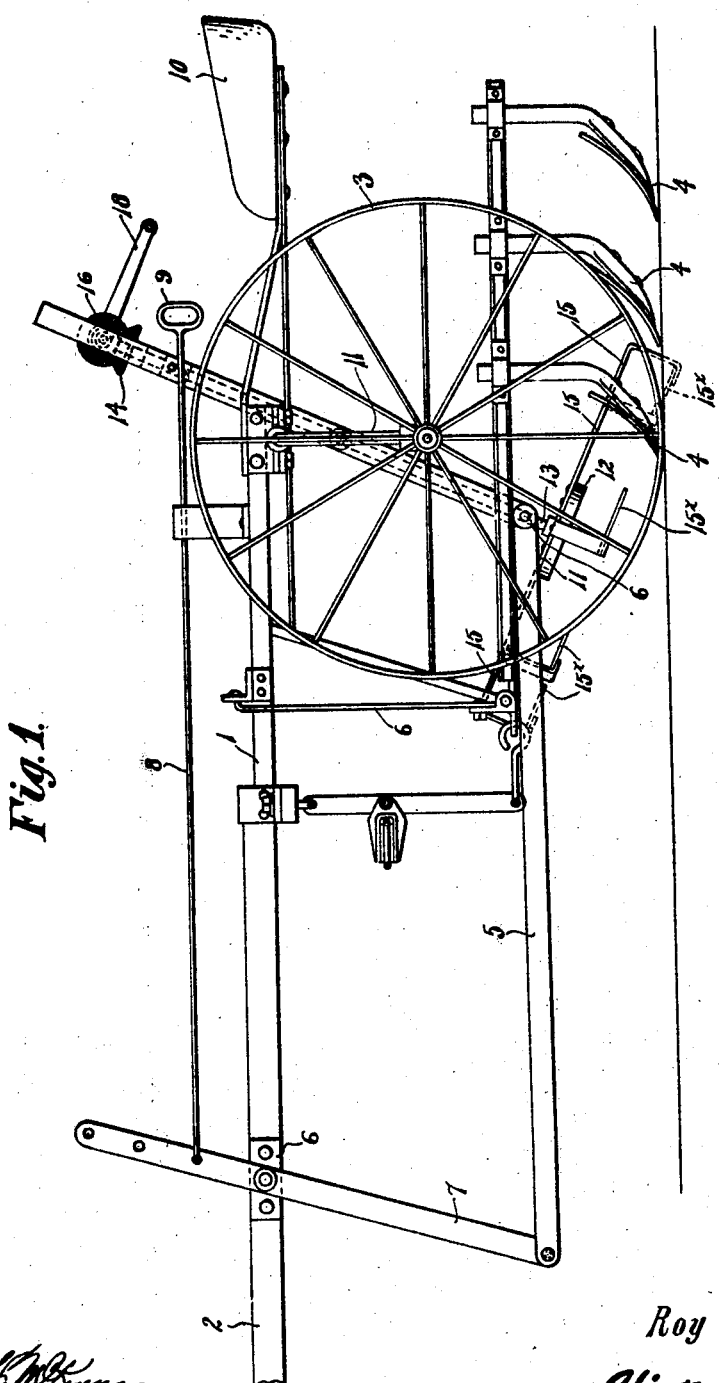
Figure 1 is a side elevation illustrating my novel chopping mechanism in association with a wheeled cultivator.

The wheeled cultivator portion of my improvement may be and preferably is of the ordinary well known construction which includes a frame 1, a tongue 2, ground wheels 3 and cultivating blades or plows 4.

In accordance with my invention I provide a longitudinal bar under and in spaced relation to the tongue 2, the said bar being numbered 5. The forward portion or arm of the lever 5 is connected in appropriate manner to the lower arm of an upright lever 7 which is fulcrumed at an intermediate point of its length on the tongue 2. The upper arm of the upright lever 7 is connected through a bar 8 with a handle 9, the said handle 9 being positioned at the left of and in proper relation to the driver's seat 10 to be conveniently manipulated by the left hand of the driver or operator disposed in the seat 10. Connected at 6 with the longitudinal bar 5 is the frame 11 of my novel chopper which includes a rotary head 12, radial arms 15 thereon and knife blades 15$^x$ carried at the outer ends of said arms. A shaft 13 is fixed to the said head 12 and mounted in bearings on the frame 11 and has a beveled gear 14 at its upper end. The said beveled gear 14 is meshed with a corresponding vertically disposed gear 16 on a horizontal shaft 17, journaled in a bracket carried by the frame 11, and fixed to the shaft 17 is a crank 18 relatively arranged to be conveniently operated by the operator in the driver's seat 10.

The frame 11 is fulcrumed at 11$^x$ on a cross-rod 12$^x$ of the cultivator frame, Figure 2, and hence the said frame is adapted to be swung in the direction of the length of the cultivator through the medium of the handle 9 and the connections described.

The rotary chopper is disposed in the relation illustrated to the blades or plows 4.

My novel apparatus is designed to be drawn by draft animals appropriately hitched to the apparatus, and it is the province of the driver of the apparatus to position the rotary chopper relative to the ground through the medium of the before described handle 9. Manifestly in some cases it is desired to chop much closer to the ground than in others, and through the medium of the handle 9 and the connections described the operator is enabled to longitudinally swing the frame 11 and thereby raise or lower the rotary chopping member and to hold the said member at various distances above the ground. It is also the province of the driver of the apparatus to turn the crank 18 and thereby rotate the chopper whenever occasion demands. For instance, as long as one of the knife blades 15$^x$ is crosswise of the row being traversed by the apparatus the said knife blade will cut everything in its path. When, however, the driver of the apparatus observes a stalk of cotton, corn or any other plant that he desires to leave in the row, he simply turns the crank 18 until the knife blade is off the row, whereupon the chopper clears and passes the stalk of cotton or the like. The driver then again turns the crank 18 and the chopper until the next knife blade is crosswise of the row. When another stalk is encountered that is to be left in the row, the driver by the means described again turns the chopper until the last-named knife blade is off the row so as to clear the said stalk, after which the chopper is again turned to position the next knife blade crosswise of the row and so on, the operation described being repeated at each stalk encountered with the result that plants are left at such points as are desired by the driver of the apparatus. Moreover it will be noticed that each stalk or plant left in the row is adequately cultivated by the blades or plows 4 after the chopper clears the said stalk or plant.

By reference to Figure 1 it will be understood that in operation the rear blades 15× are disposed below the surface of the ground at an angle to said surface, due to the inclination of the frame 11. The front blades 15× are designed to pass over the tops of the plants. As many of the plants as the operator desires are cut by rear blades at points below the surface of the ground.

In addition to the practical advantages ascribed to my improvement it will be noted that the same is simple and inexpensive in construction and is well adapted to withstand the usage to which apparatus of corresponding character is ordinarily subjected. I would also have it understood that it is within the purview of my invention to combine my novel chopping mechanism with wheeled cultivators such as are at present in general use.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

In a chopping apparatus, the combination of a wheeled frame, a tongue connected thereto, a longitudinal bar spaced below the tongue, an upright lever fulcrumed on the tongue and having its lower arm connected with the forward arm of the longitudinal bar, a handle connected with the upper arm of the upright lever, a frame pivoted at an intermediate point of its length of the wheeled frame and connected to said bar, a rotary chopper supported by the longitudinal bar and second frame, and manual means on the second frame for rotating said chopper.

In testimony whereof I affix my signature.

ROY DERRICK.